United States Patent
Nicholas et al.

(10) Patent No.: US 9,657,782 B2
(45) Date of Patent: May 23, 2017

(54) METHOD AND APPARATUS FOR ASSEMBLING A DRIVESHAFT FLANGE TO A TRANSMISSION FLANGE

(71) Applicant: Ford Motor Company, Dearborn, MI (US)

(72) Inventors: Christopher Peter Nicholas, Milford, MI (US); Scott Wilson, Lexington, MI (US); Brian John Brown, Clinton Township, MI (US); Duane Allan Lewis, Westland, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 22 days.

(21) Appl. No.: 14/699,019

(22) Filed: Apr. 29, 2015

(65) Prior Publication Data

US 2016/0319877 A1    Nov. 3, 2016

(51) Int. Cl.
| | |
|---|---|
| *F16D 1/033* | (2006.01) |
| *F16D 1/076* | (2006.01) |
| *F16D 3/38* | (2006.01) |

(52) U.S. Cl.
CPC ............ *F16D 1/076* (2013.01); *F16D 1/033* (2013.01); *F16D 3/387* (2013.01);
(Continued)

(58) Field of Classification Search
CPC .......... F16B 39/00; F16D 1/033; F16D 1/076; F16D 3/382; F16D 3/387; F16D 3/405;
(Continued)

(56) References Cited

U.S. PATENT DOCUMENTS

| | | | | |
|---|---|---|---|---|
| 3,289,726 A | * | 12/1966 | Sauter ................... | F16B 5/0208 144/24.12 |
| 7,204,668 B2 | * | 4/2007 | Le .......................... | F16B 21/186 411/353 |
| 7,445,558 B2 | * | 11/2008 | Gerding ................... | F16D 1/076 464/134 |

FOREIGN PATENT DOCUMENTS

| | | | | |
|---|---|---|---|---|
| FR | 1005498 A | * | 4/1952 | ............. F16D 1/076 |
| FR | 2885663 A1 | | 11/2006 | |

OTHER PUBLICATIONS

"A guide to threadlocking adhesives." Reliable Plant. Shannahan, Mike. May 28, 2013, [online], [retrieved on Jun. 7, 2016]. Retrieved from the Internet <URL: https://web.archive.org/web/20130528020650/http://www.reliableplant.com/Read/27159/Guide-to-threadlocking-adhesives>.*

(Continued)

*Primary Examiner* — Josh Skroupa
(74) *Attorney, Agent, or Firm* — Damian Porcari; Brooks Kushman P.C.

(57) ABSTRACT

A drivetrain assembly includes a transmission and a driveshaft that are joined together by a transmission flange and a driveshaft flange that has a plurality of pre-assembled bolts. The driveshaft flange defines a plurality of holes and countersink recesses and the bolts are secured to the driveshaft flange by a bolt retainer disposed in each of the countersink recesses between the transmission flange and the driveshaft flange. A method is disclosed for assembling a transmission flange and a driveshaft flange that defines a plurality of holes and countersink recesses. A bolt is assembled into each of the holes and countersink recesses and a bolt retainer is attached to each of the bolts and nested inside the countersink recesses to retain the bolts on the driveshaft flange. The bolts on the driveshaft flange are then installed into the threaded holes of the transmission flange.

11 Claims, 4 Drawing Sheets

(52) U.S. Cl.
CPC ..... *F16D 2300/12* (2013.01); *Y10T 29/49948* (2015.01); *Y10T 403/1624* (2015.01); *Y10T 403/645* (2015.01)

(58) Field of Classification Search
CPC ........... F16D 2300/12; Y10T 29/49948; Y10T 403/15–403/1624; Y10T 403/1683; Y10T 403/645
USPC ...... 29/525.02; 403/10–14, 21, 337; 411/82, 411/103, 107, 134, 135; 464/112, 132, 464/134, 182
See application file for complete search history.

(56) References Cited

OTHER PUBLICATIONS

"Abrasion & Wear Resistant Coatings." Metal Coatings. [online], [retrieved on Jun. 7, 2016]. Retrieved from the Internet <URL: http://www.metcoat.com/abrasion-resistant-coatings.htm>.*
"Lock Washers." Seastrom Manufacturing Co, Inc. Jan. 29, 2013, [online], [retrieved on Jun. 7, 2016]. Retrieved from the Internet <URL: https://web.archive.org/web/20130129053704/http://www.seastrom-mfg.com/washers_lock.aspx>.*

* cited by examiner

METHOD AND APPARATUS FOR ASSEMBLING A DRIVESHAFT FLANGE TO A TRANSMISSION FLANGE

TECHNICAL FIELD

This disclosure relates to a method and an apparatus for assembling a driveshaft with preassembled fasteners to a transmission.

BACKGROUND

The drivetrain for a vehicle may include a combustion engine or an electric motor that provides torque through a transmission to a driveshaft. The driveshaft transmits the torque to the wheels of the vehicle. The transmission and driveshaft are separate components that are generally separately manufactured and assembled together with fasteners on the final assembly line. During final assembly, the threaded fasteners, such as bolts, are separately assembled and secured to the transmission flange and the driveshaft flange. This requires assemblers on the final assembly line to handle the bolts that are hand started to secure the bolts. Assembling the flanges together with bolts is labor intensive and time consuming for assembly workers.

The transmission and driveshaft are secured together by connecting flanges of both parts with threaded fasteners that may be coated with a locking coating, such as Locktite® a trademark of Electrosteel USA LLC, that resists loosening of the connection caused by vibrations during operation of the vehicle. The locking coating is applied to the threads of the threaded fastener. During the process of securing the transmission flange and the driveshaft flange together, particles of the locking coating can become dislodged and trapped between mating flat surfaces of the transmission flange and the driveshaft flange. The close tolerances are specified for connecting the transmission flange to the driveshaft flange. Particles from the locking coating may become lodged between the flanges causing the flanges not to be flush with one another. If the transmission flange and the driveshaft flange are not flush with each other, the assembly will be out of specification and potentially may be imbalanced and resulting in unwanted noise, vibration and harshness issues.

This disclosure is directed to addressing the above problems and other problems as summarized below.

SUMMARY

According to one aspect of this disclosure, a drivetrain assembly is disclosed that includes a transmission and a driveshaft that are joined together by a transmission flange and a driveshaft flange with a plurality of pre-assembled bolts. The transmission flange defines a plurality of threaded holes and the driveshaft flange defines a plurality of holes and countersink recesses. The bolts are each secured to the driveshaft flange by a bolt retainer disposed in each of the countersink recesses between the transmission flange and the driveshaft flange.

Another aspect of this disclosure relates to a driveshaft flange sub-assembly provided on part of a constant velocity joint of a drive shaft. The drive shaft includes a driveshaft flange defining a plurality of holes and countersink recesses. A plurality of bolts are assembled into the holes and countersink recesses of the driveshaft flange sub-assembly. A plurality of bolt retainers are each assembled to a threaded shaft of one of the bolts and are disposed inside the countersink recesses.

Other aspects of the disclosure as it relates to the driveshaft assembly and the driveshaft sub-assembly, as summarized above, may further include that the bolt retainer may be a push-on stamped nut that is assembled to each of the bolts to retain the bolts on the driveshaft flange. The bolt may have a threaded shaft and the bolt retainer may be a washer that defines a central hole with a plurality of teeth formed around the central hole that engage the threaded shaft to retain the bolts on the driveshaft flange. The bolts may be coated with a locking coating before insertion into the driveshaft flange and particles from the locking coating may be trapped inside the countersink recesses by the bolt retainer. The bolt retainer may be completely received within the countersink recesses. Further, the bolt retainer may function to center each of the bolts in the holes defined by the driveshaft flange and retain the bolts in alignment with the threaded holes defined by the transmission flange.

According to another aspect of this disclosure, a method of assembling a driveshaft flange sub-assembly is disclosed that comprises: providing a driveshaft that includes the driveshaft flange that defines a plurality of holes and countersink recesses; assembling a bolt into each of the holes; and attaching a bolt retainer to each of the bolts and nesting the bolt retainers inside the countersink recesses.

According to another aspect of this disclosure, a method is disclosed for assembling a driveshaft flange and a transmission flange. The method comprises first providing a driveshaft that includes the driveshaft flange that defines a plurality of holes and countersink recesses. A transmission is provided that includes a transmission flange that defines a plurality of threaded holes. A bolt is assembled into each of the holes and countersink recesses and a bolt retainer is attached to each of the bolts and nested inside the countersink recesses to retain the bolts on the driveshaft flange. The bolts on the driveshaft flange are pre-assembled to the driveshaft flange and are subsequently installed into the threaded holes of the transmission flange.

According to alternative aspects of the above methods, the methods may further comprise applying a locking coating to the bolts. Particles of the locking coating may be abraded from the bolts. If so, the particles may be collected in the countersink recesses and confined in the countersink recesses by the bolt retainer.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
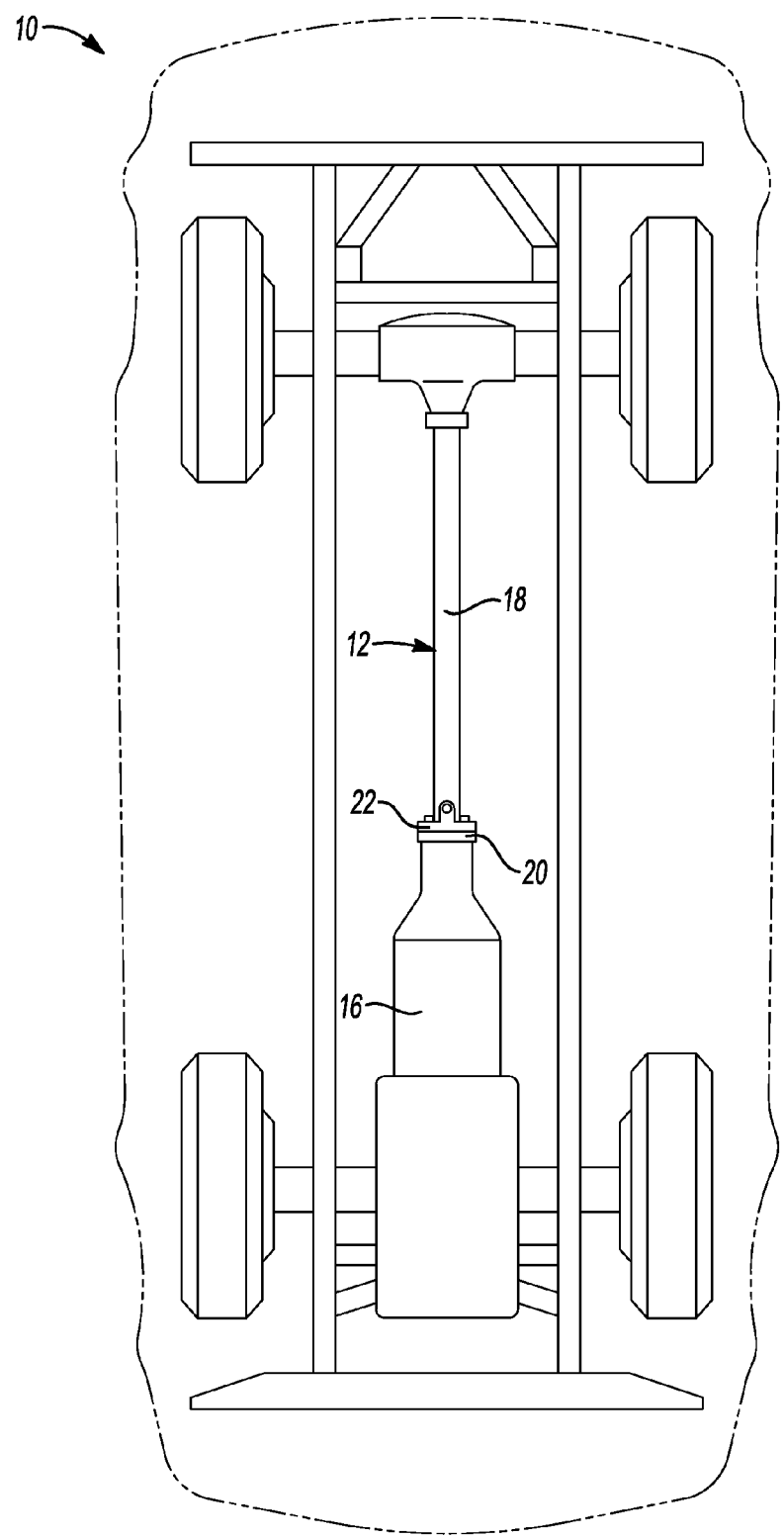
FIG. 1 is a bottom plan view of a vehicle illustrating the drivetrain assembled to a vehicle shown in phantom.

Referring to FIG. 1, a vehicle 10 is shown in phantom with a drivetrain assembly 12. The drivetrain assembly 12 includes a transmission 16 and a driveshaft 18. The transmission 16 includes a transmission flange 20 and the driveshaft 18 includes a driveshaft flange 22.

Figure 2:
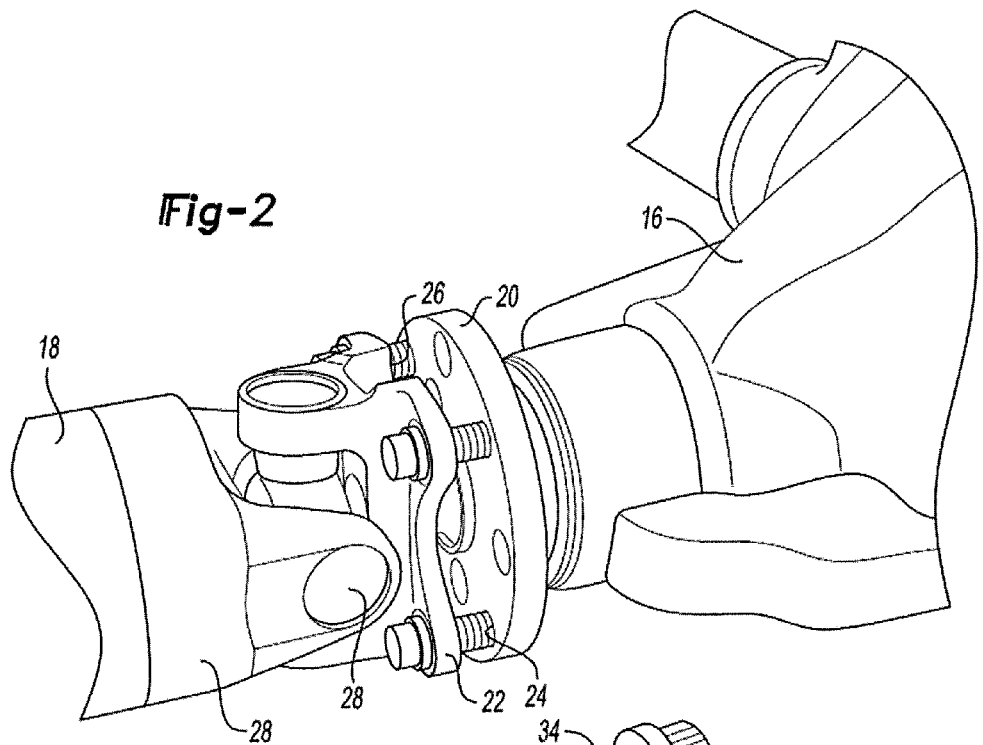
FIG. 2 is a fragmentary perspective view of a driveshaft including a constant velocity joint that includes a driveshaft flange shown being assembled to a transmission flange associated with a transmission showing a plurality of bolts assembled into the transmission flange.

Referring to FIG. 2, a transmission 16 is shown to be connected to a driveshaft 18. In FIG. 2, the driveshaft flange 22 is shown separated from the transmission flange 20 to illustrate the threaded holes 24 that are provided on the transmission flange 20. When fully assembled, the transmission flange 20 and driveshaft flange 22 are normally secured together in a face-to-face relationship. The threaded holes 24 defined by the transmission flange 20 are aligned with holes 26 that are provided on the driveshaft flange 22. As illustrated in FIG. 2, the driveshaft 18 includes a constant velocity joint 28 (CV joint) and the driveshaft flange 22 is provided as a part of the CV joint 28.

Figure 3:
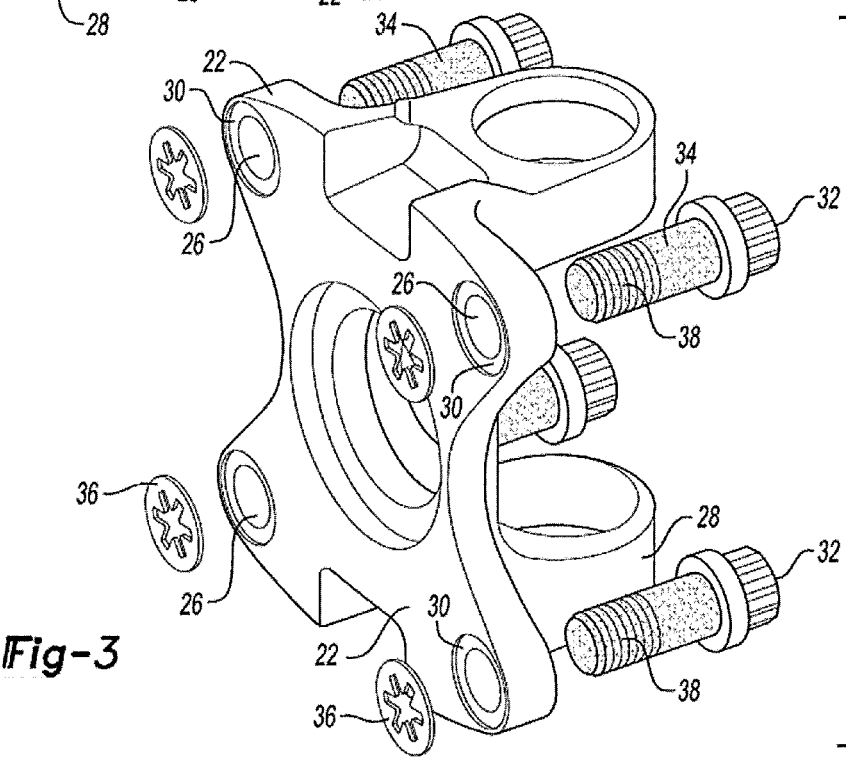
FIG. 3 is an exploded perspective view of a constant velocity joint including a driveline flange with a plurality of threaded fasteners and bolt retainers shown in alignment with holes defined by the driveshaft flange.

Referring to FIG. 3, the part of the CV joint 28 including the driveshaft flange 22 is illustrated in an exploded perspective view. The driveshaft flange 22 includes a plurality of countersink recesses 30 that are provided in combination with the holes 26. A plurality of bolts 32 are shown in alignment with the holes 26 and countersink recesses 30 prior to assembly. The bolts 32 are coated with a locking coating 34, such as Locktite®. The locking coating 34 is applied to a threaded shaft 38 of the bolts to lock the bolts 32 into the threaded holes 24 of the transmission flange 20.

The bolts are retained in the holes 26 by bolt retainer 36. The bolt retainer 36 may be a push-on stamped nut. The bolt retainer 36 is attached to the threaded shaft 38 of the bolts 32 when the bolts 32 are pre-assembled into the holes 26 of the driveshaft 18.

Figure 4:
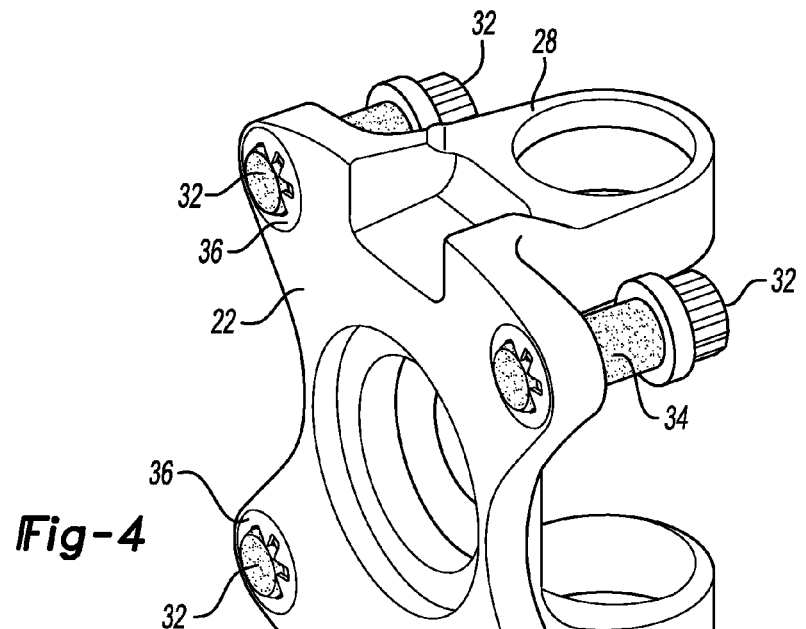
FIG. 4 is a perspective view of part of a constant velocity joint with bolts pre-assembled to the driveshaft flange and being retained by bolt retainers in a position to be assembled to the transmission flange.

Referring to FIG. 4, the driveshaft flange 22 and CV joint 28 are shown with the bolts 32 partially inserted through the holes 26 with the bolt retainers 36 received in the countersink recess 30. In assembly, the bolts 32 are inserted into the holes 26 and through the countersink recesses 30. The bolt retainers 36 are pushed on the ends of the bolts 32 that are held in alignment for insertion into the threaded holes 24 on the transmission flange 20. The driveshaft flange 22, bolts 32 and bolt retainers 36 are shown as a sub-assembly ready to be assembled to the transmission flange 20 of the transmission 16. The sub-assembly may be delivered to an assembly line with the bolts 32 and bolt retainers 36 as parts included in the sub-assembly.

Figure 5:
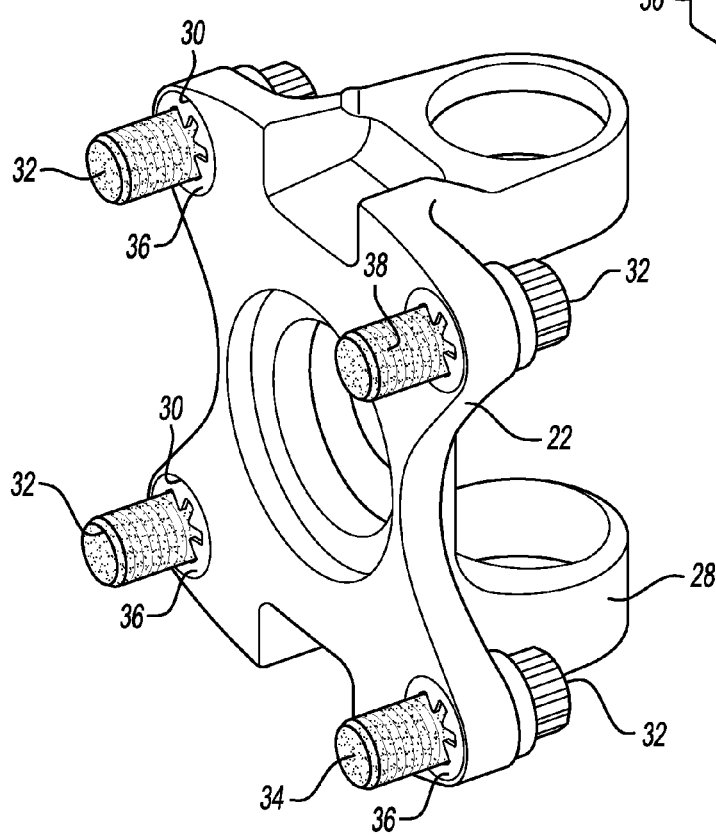
FIG. 5 is a perspective view of part of a constant velocity joint including a driveshaft flange with the plurality of bolts and bolt retainers fully attached to the driveshaft flange.

Referring to FIG. 5, the bolts are shown fully inserted into the holes 26 (shown in FIG. 3) with the bolt retainers 36 secured to the threaded shaft 38. The bolt retainers 36 are each received within one of the countersink recesses 30. The transmission flange 20 is not illustrated in FIG. 5, but should be understood to be assembled tightly against the driveshaft flange 22 with the threaded shafts 38 of the bolts 32 being fully received within the threaded holes 24 defined by the transmission flange 20. Any particles broken away from the bolts 32 that may be dislodged from the locking coating 34 as the bolt retainers 36 are pushed on the bolts 32 are trapped inside the countersink recesses 30 by the bolt retainers 36. The bolt retainers 36 function to trap the particles within the countersink recesses 30 and the holes 26.

Figure 6:
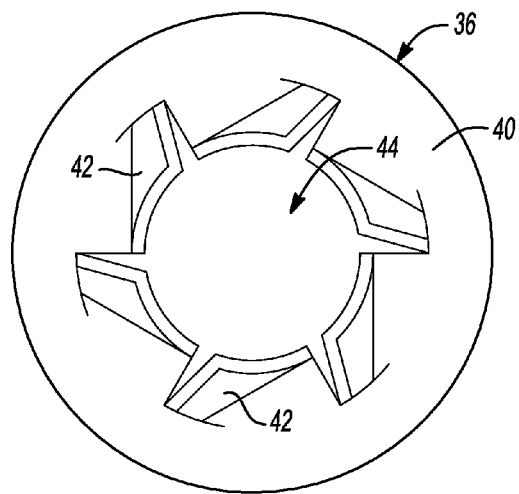
FIG. 6 is an elevation view of a push-on snap nut.

Referring to FIG. 6, the bolt retainer 36 is shown to include a washer portion 40. A plurality of teeth 42 are provided around a central hole 44. The teeth 42 engage the threaded shaft 38 when the bolt retainer 36, or push-on nut, is pushed onto the threaded shaft 38. The bolt retainer 36 fits completely within the countersink recess 30 when the bolt 32 is fully secured into the transmission flange 20. The washer portion 40 of the bolt retainer 36 functions to contain particles of Locktite® within the countersink recess 30, as previously explained. Other types of bolt retainers may be used other than a push-on stamped nut.

Figure 7:
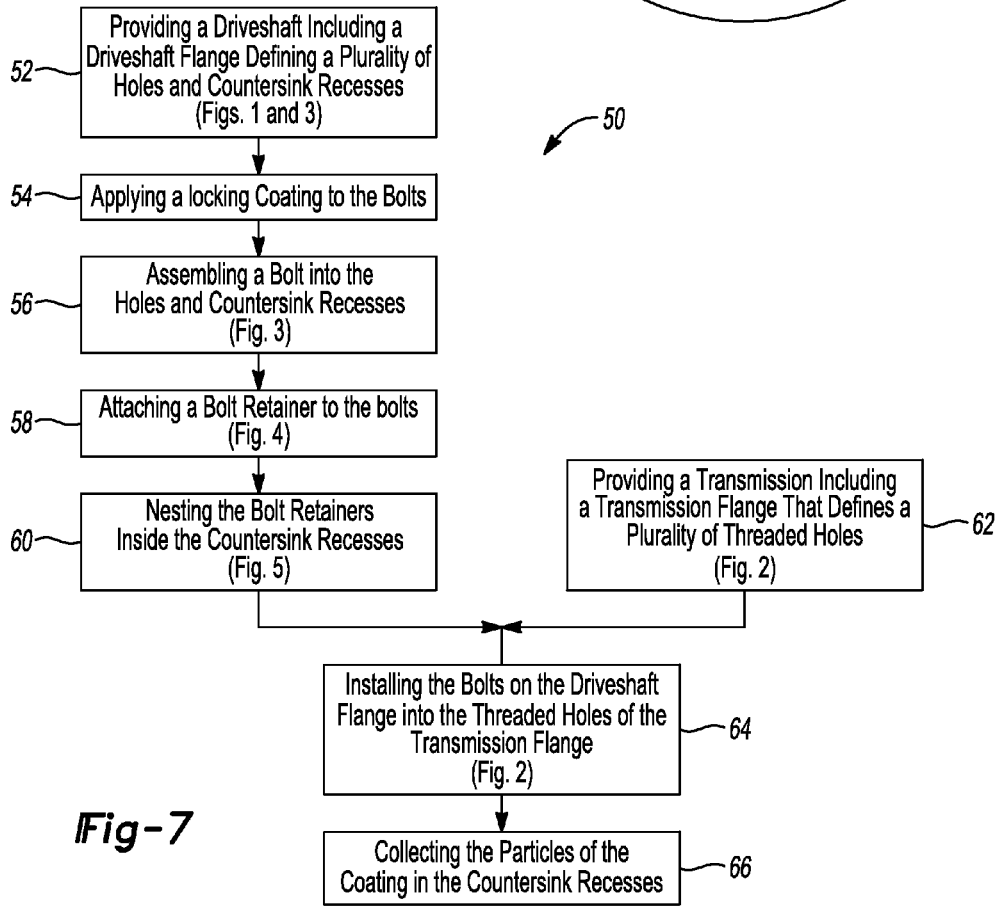
FIG. 7 is a flowchart illustrating one method of assembling a driveshaft flange to a transmission flange.

Referring to FIG. 7, the method of assembling a driveshaft flange to a transmission flange is illustrated by a flowchart. The process, generally indicated by reference numeral 50, begins at 52 by providing a driveshaft including a driveshaft flange that defines a plurality of holes and countersink recesses. As shown in FIG. 3, a locking coating is applied to the bolts at 54. The bolts 32 are assembled into the holes 26 and countersink recesses 30 at 56. As shown in FIG. 4, a bolt retainer 36 is attached to the bolts at 58. As shown in FIG. 5, the bolt retainers 36 are nested inside the countersink recesses 30 at 60. As shown in FIG. 2, a transmission 16 including a transmission flange 20 is then provided that defines a plurality of threaded holes at 62. As shown in FIG. 2, the bolts 32 on the driveshaft flange 22 are installed into the threaded holes 24 of the transmission flange 20 at 64. As the bolts 32 are installed into the threaded holes 24 of the transmission flange 20, particles of the locking coating that may be broken from the threaded shaft 38 of the bolt 32 are collected in the countersink recess 30 at 66.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A drivetrain assembly including a transmission and a driveshaft comprising:
   a transmission flange provided on the transmission, the transmission flange defining a plurality of threaded holes;
   a driveshaft flange provided on the driveshaft, the driveshaft flange defining a plurality of holes and countersink recesses; and
   a plurality of bolts secured to the driveshaft flange by a plurality of bolt retainers disposed in each of the countersink recesses between the transmission flange and the driveshaft flange, wherein the bolts are coated with a locking coating before insertion into the driveshaft flange, and wherein particles from the locking coating are trapped inside the countersink recesses by the bolt retainers.

2. The drivetrain assembly of claim 1 wherein the bolt retainers are push-on stamped nuts that are assembled to each of the bolts to retain the bolts on the driveshaft flange.

3. The drivetrain assembly of claim 1 wherein each of the bolts has a threaded shaft and the bolt retainers are washers that define a central hole, and further comprises a plurality of teeth formed around the central hole that engage the threaded shaft to retain the bolts on the driveshaft flange.

4. The drivetrain assembly of claim 1 wherein the bolt retainers are completely received within the countersink recesses.

5. The drivetrain assembly of claim 1 wherein each of the bolt retainers align each of the bolts in the holes defined by the driveshaft flange and retain the bolts in alignment with the threaded holes defined by the transmission flange.

6. A driveshaft flange sub-assembly provided on a constant velocity joint of a drive shaft comprising:
   a driveshaft flange defining a plurality of holes and countersink recesses;
   a plurality of bolts assembled into the holes and countersink recesses; and
   a plurality of bolt retainers each assembled to a threaded shaft of one of the bolts and each being disposed inside one of the countersink recesses, wherein the bolts are coated with a locking coating before insertion into the driveshaft flange; and wherein particles from the locking coating are trapped inside the countersink recesses by the bolt retainers.

7. The driveshaft flange sub-assembly of claim 6 wherein the bolt retainers are a push-on stamped nut assembled to each of the bolts to retain the bolts on the driveshaft flange.

8. The driveshaft flange sub-assembly of claim 6 wherein each of the bolts have a threaded shaft and the bolt retainers are washers that define a central hole, and wherein the bolt retainers further comprise a plurality of teeth formed around the central hole that engage the threaded shaft to retain the bolts on the driveshaft flange.

9. The driveshaft flange sub-assembly of claim 6 in combination with a driveshaft including a transmission flange defining a plurality of threaded holes, wherein the bolt retainers align each of the bolts in the holes defined by the driveshaft flange and retain the bolts in alignment with the threaded holes defined by the transmission flange.

10. A method of assembling a driveshaft flange comprising:
    providing a driveshaft including the driveshaft flange that defines a plurality of holes and countersink recesses;
    applying a locking coating to bolts;
    assembling one bolt into each holes;
    attaching a bolt retainer to each bolt;
    nesting each bolt retainer inside one of the countersink recesses, and
    confining any particles abraded from the locking coating from the bolts in the countersink recesses with the bolt retainer.

11. A method of assembling a driveshaft flange and a transmission flange comprising:
    providing a driveshaft that includes the driveshaft flange that defines a plurality of holes and countersink recesses;
    providing a transmission that includes the transmission flange that defines a plurality of threaded holes;
    applying a locking coating to a plurality of bolts;
    assembling one of the bolts into each of the holes and countersink recesses;
    attaching a bolt retainer to each of the bolts and nesting the bolt retainers inside the countersink recesses to retain the bolts on the driveshaft flange; and
    abrading particles of the locking coating from the bolts;
    collecting the particles in the countersink recesses that are confined in the countersink recesses by the bolt retainer; and
    installing the bolts on the driveshaft flange into the threaded holes of the transmission flange.

* * * * *